United States Patent Office 3,799,759
Patented Mar. 26, 1974

3,799,759
ARYL THIOUREA FRUIT ABSCISSION METHOD
Henry Martin, Basel, Dieter Duerr, Bottmingen, and Adolf Hubele, Riehen, Switzerland, Georg Pissiotas, Loerrach, Germany, and Otto Rohr, Therwil, and Jacques Rufener, Bottmingen, Switzerland, assignors to Ciba-Geigy AG, Basel, Switzerland
No Drawing. Filed Nov. 17, 1971, Ser. No. 199,804
Claims priority, application Switzerland, Nov. 19, 1970, 17,187/70
Int. Cl. A01n 9/12
U.S. Cl. 71—99
4 Claims

ABSTRACT OF THE DISCLOSURE

The invention is concerned with a process and an agent for the promotion of fruit abscission, particularly for the facilitating of the fall of the fruit, and of the manual and mechanical harvesting of fruits and berries, said process comprising treating the fruit-bearing trees and bushes, shortly before the ripening of the fruit, with an agent containing as active substance a thiourea derivative of Formula I:

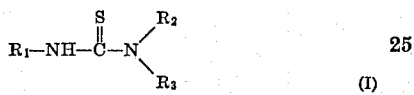

(I)

wherein $R_1$ represents an unsubstituted phenyl radical, or a phenyl radical mono- or polysubstituted by lower alkyl or alkoxy, by halogen, haloalkyl and/or optionally chlorinated phenoxy, the allyl, benzyl, or phenethyl radical, the norbornenyl radical, or a 4,7-methano-indan-5-yl radical at least partially hydrogenated,
$R_2$ represents hydrogen, a lower alkyl or alkoxy radical, or the allyl radical, and
$R_3$ represents hydrogen, an optionally substituted phenyl radical, a lower alkyl, alkenyl, chloroalkenyl or dialkylamino radical, or the furfuryl radical, or
$R_2$ and $R_3$ together can also form an alkylene bridge.

---

The present invention relates to a process and to an agent for the promotion of fruit abscission, particularly for the facilitating of the fall of the fruit, and of the manual and mechanical harvesting of fruits, such as berries.

The surprising discovery has been made that fruits can be conditioned to fall, either without or with a very slight application of mechanical force, and hence greater economy in cropping achieved, by the treatment of the fruit-bearing plants, before the cropping of the fruit, with certain thiourea derivatives.

The process according to the invention is characterized in that the fruit-bearing trees and bushes are treated, shortly before the ripening of the fruit, with an agent containing as active substance a thiourea derivative of Formula I:

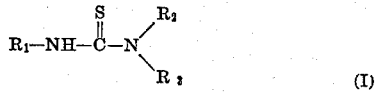

(I)

wherein $R_1$ represents an unsubstituted phenyl radical or a phenyl radical mono- or polysubstituted by lower alkyl or alkoxy, by halogen, haloalkyl and/or optionally chlorinated phenoxy, the allyl, benzyl, or phenethyl radical, the norbornenyl radical, or a 4,7-methano-indan-5-yl radical at least partially hydrogenated,
$R_2$ represents hydrogen, a lower alkyl or alkoxy radical, or the allyl radical, and $R_3$ represents hydrogen, an optionally substituted phenyl radical, a lower alkyl, alkenyl, chloroalkenyl or dialkylamino radical, or the furfuryl radical, or
$R_2$ and $R_3$ together can also form an alkylene bridge.

Lower alkyl and alkoxy radicals $R_2$ and $R_3$ and substituents of a phenyl radical $R_1$ are radicals having 1 to 4 carbon atoms, such as methyl, ethyl, propyl, isopropyl and the various butyl radicals, as well as methoxy, ethoxy, etc. Alkenyl radicals and chloroalkenyl radicals $R_3$ contain 2 to 4 C-atoms; the allyl radical and the 2-chloroallyl radical are preferred. The preferred dialkylamino radical for $R_3$ is the dimethylamino radical.

Substituents of a phenyl radical $R_3$ can be the same as for $R_1$; lower alkyl radicals are preferred, especially methyl. Suitable halogen substituents of a phenyl radical $R_1$ are fluorine, chlorine and bromine; the preferred haloalkyl radical is trifluoromethyl.

A norbornenyl radical $R_1$ has the formula:

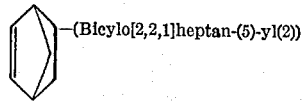

By completely or partially hydrogenated 4,7-methano-indanyl-(5) radicals $R_1$ are meant, in particular, the radicals:

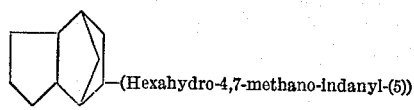

and preferably:

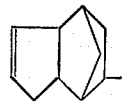

(3a,4,6,7a tetrahydro-4,7-methano-indenyl-(5))

$R_2$ and $R_3$ together can also form an alkylene bridge, and they then form with the nitrogen atom a 6- or preferably a 5-membered heterocycle (piperidine or pyrrolidine).

A phenyl radical $R_1$ can be polysubstituted, preferably disubstituted, with identical or different substituents in any desired positions.

Particularly suitable for the purpose according to the invention are such monosubstituted thioureas of Formula I in which $R_2$ and $R_3$ both represent hydrogen, and $R_1$ represents a phenyl radical mono- or disubstituted by lower alkyl or alkoxy, by halogen, trifluoromethyl and/or chlorophenoxy, or it represents the benzyl or phenethyl radical.

A further effective group is constituted by disubstituted thioureas of Formula I wherein $R_1$ represents an unsubstituted phenyl radical or a phenyl radical mono- or disubstituted by lower alkyl, alkoxy and/or halogen; $R_2$ represents hydrogen; and $R_3$ represents an alkyl radical, the allyl or 2-chloroallyl group, or the dimethylamino radical.

But also trisubstituted thioureas, and such ones having norbornenyl and allyl radicals for $R_1$, have proved to be very effective.

Examples of thiourea derivatives usable according to the invention and corresponding to the formula:

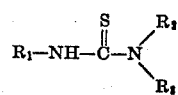

are listed on the following pages.

| | R₁ | R₂ | R₃ | M.P., deg. |
|---|---|---|---|---|
| 1 | Ortho-methylphenyl | H | H | 160–161 |
| 2 | Ortho-ethylphenyl | H | H | 145–147 |
| 3 | Para-n-butylphenyl | H | H | 146–148 |
| 4 | p-Chlorophenyl | H | H | 177–178 |
| 5 | p-Ethoxyphenyl | H | H | 176–177 |
| 6 | p-Methylphenyl | H | H | 185–186 |
| 7 | 2-chloro-5-trifluoro methyl-phenyl | H | H | 147–149 |
| 8 | 2-methyl-5-chlorophenyl | H | H | 154–155 |
| 9 | 2-methyl-6-chlorophenyl | H | H | 165 |
| 10 | 2,6-dimethylphenyl | H | H | 195 |
| 11 | 2-methyl-4-chlorophenyl | H | H | 178–180 |
| 12 | 2-trifluoromethylphenyl | H | H | 161–163 |
| 13 | 2-methoxyphenyl | H | H | 148–157 |
| 14 | 2-isopropylphenyl | H | H | 120–122 |
| 15 | p-(4-chlorophenoxy)-phenyl | H | H | 162–165 |
| 16 | Ortho-methylphenyl | H | Ortho-methyl-phenyl | 153 |
| 17 | 4-fluorophenyl | H | 2-chloroallyl | 99–101 |
| 18 | 4-bromophenyl | H | do | 96.5–98 |
| 19 | 3-fluorophenyl | H | do | 79–81 |
| 20 | 2,6-dimethylphenyl | H | Allyl | 75 |
| 21 | do | H | Ethyl | 132–133 |
| 22 | 2-ethylphenyl | H | Methyl | 115–117 |
| 23 | do | H | Allyl | 84–85.5 |
| 24 | Phenyl | H | n-Butyl | 61 |
| 25 | 3,4-dichlorophenyl | H | Methyl | 148–150 |
| 26 | 2-methyl-4-chlorophenyl | H | n-Propyl | 70 |
| 27 | do | H | Ethyl | 96–97 |
| 28 | do | H | Dimethylamino | 169.5 |
| 29 | 2-methoxyphenyl | H | Methyl | 128–131 |
| 30 | 2-methylphenyl | H | do | 150–150 |
| 31 | 2-methyl-4-chlorophenyl | H | n-Butyl | 89–90 |
| 32 | do | CH₃ | Isopropyl | 134–135 |
| 33 | do | CH₃ | CH₃ | 175 |
| 34 | do | |  | 205 |
| 35 | 2-methyl-6-chlorophenyl | CH₃ | CH₃ | 143 |
| 36 | 3-fluorophenyl | –OCH₃ | CH₃ | 48–50 |
| 37 | Phenyl | C₂H₅ | C₂H₅ | (¹) |
| 38 | Allyl | H | CH₃ | 52 |
| 39 |  | H | CH₃ | 122 |
| 40 | Same as above | H | Furfuryl | 90–91 |
| 41 | do | CH₃ | CH₃ | 106–108 |
| 42 | do | Allyl | Allyl | 56 |
| 43 |  | CH₃ | CH₃ | 106–109 |
| 44 | Benzyl | H | H | 168 |
| 45 | Phenethyl 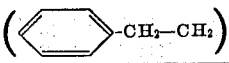 | H | H | 136–137 |

¹ Oil B. P., 182°/15 Torr.

The thioureas of Formula I are for the most part known, or can be readily produced by methods known per se.

The active substances of Formula I are excellent for the promotion of the fall of the fruit (fruit abscission). The gathering and picking of fruits such as, e.g. apples, pears, cherries, damsons, peaches, apricots, olives, lemons, oranges, and berries such as, e.g. currants, gooseberries, grapes, etc., are usually performed by hand. As part of the process of rationalization in agriculture, other methods of fruit harvesting have been initiated. The most diverse mechanical devices have been developed for this purpose, but such mechanical equipment, as a rule, damages the plants and the crops being harvested.

The use according to the invention of thioureas of Formula I renders it possible that such fruits can be caused to fall, either without or with very slight application of mechanical force, and hence harvested more economically, if the trees, bushes or plants are treated, shortly before the ripening of the fruits, with the agents containing the active substances.

The active substances of Formula I are applied in admixture with suitable carriers, solvents and/or other additives. Suitable carriers and additives can be solid or liquid, and correspond to the substances commonly used in the processing of preparations, such substances being, e.g. natural and regenerated mineral materials, solvents, dispersing agents, wetting agents, adhesives, thickeners or binders.

These agents can be applied by the spraying of the plants with an aqueous solution or suspension containing the active substances according to the invention in concentrations of 100 to 3000 p.p.m. (parts per million).

The agents may also be employed in the form of solutions, suspensions, granulates or dusts. The preparations must ensure a fine dispersibility of the active substance.

Suitable for the preparation of solutions are solvents such as, in particular, alcohols, e.g. ethyl or isopropyl alcohol; ketones such as acetone or cyclohexanone; aliphatic hydrocarbons such as kerosene; cyclic hydrocarbons such as benzene, toluene, xylene, tetrahydronaphthalene, alkylated naphthalenes, also chlorinated hydrocarbons such as tetrachloroethane, ethylene chloride, and, finally, also mineral and vegetable oils, or mixtures of the above mentioned materials.

In the case of aqueous preparations, these are dispersions. The active substances, as they are or in one of the above stated solvents, are homogenized in water, preferably by means of dispersing agents. Mentioned as cation-active dispersing agents are, e.g. quaternary ammonium compounds; as anion-active dispersing agents, e.g. soaps, aliphatic long-chain sulphuric acid monoesters, aliphatic-aromatic sulphonic acid, long-chain alkoxyacetic acids; and as non-ionogenic dispersing agents: polyglycol ethers of fatty alcohols or alkylphenols with ethylene oxide. On the other hand, it is also possible to produce concentrates consisting of active substance, dispersing agent, and possibly solvent. Such concentrates can be diluted before application, e.g. with water, and are then in the form of emulsions or suspensions.

Dusts can be produced by the mixing or grinding together of the active substance with a solid carrier. Suitable carriers are, e.g. talcum, diatomaceous earth, kaolin, bentonite, calcium carbonate, boric acid, tricalcium phosphate, but also wood flour, cork flour, charcoal, and other materials of vegetable origin. The substances may also be drawn with a volatile solvent on to the carriers. By the addition of wetting agents and protective colloids, it is possible to prepare wettable powders, and pastes which can be suspended in water.

The content of active substance in the above described agents can vary within wide limits, depending on whether the agent is to be marketed as a concentrate (wettable powder), or as a product in a highly diluted form. Concentrates can have contents of active substance up to 99.5%, whilst diluted aqueous suspensions for the spraying of plants often have active substance contents of 0.01% to 0.3%. It is not the concentration of the agent which is important but the amount of active substance actually applied.

The treatment of the fruit-bearing plants with the agents is carried out, depending on the type of plants, 7 to 15 days, and sometimes up to 20 days, before harvesting. The preferred method of application is the spraying or dusting of the leaves and fruit on the trees and bushes. The treatment of the roots via the soil is possible, but is not recommended owing to a too long a period of time before comencement of the effect.

The invention is further illustrated by the following examples:

EXAMPLE 1

Dust

Equal parts of an active substance of Formula I, e.g. active substance No. 10, and precipitated silicic acid are finely ground. The ground materials are then mixed with kaolin or talcum to obtain dusts containing 1 to 6% of active substance.

EXAMPLE 2

Wettable powder

The following constituents are mixed together and finely ground to produce a 50% wettable powder:

50 parts of active substance No. 17,
20 parts of highly dispersed silicic acid,
25 parts of bolus alba (kaolin),
1.5 parts of sodium 1-benzyl-2-stearyl-benzimidazole-6,3'-disulphonate,
3.5 parts of the reaction product from p-tert.octylphenol and ethylene oxide.

EXAMPLE 3

Emulsion concentrate

Readily soluble active substances were made up as an emulsion concentrate according to the following directions:

20 parts of active substance,
70 parts of xylene,
10 parts of a mixture of a reaction product of an alkylphenol with ethylene oxide and calciumdodecylbenzenesulphonate are mixed together. The mixture is diluted with water to the desired concentration to obtain a sprayable emulsion.

The following field test was carried out to determine the abscission effect on apples and on Temple oranges (citrus):

Apple trees of the type Golden Delicious and also Temple orange trees were sprayed 15 days before the intended cropping of the fruit with aqueous preparations of the active substances Nos. 10, 17 and 19, the spray solution containing, in each case, 0.2% of active substance. A spring balance was used on picking of the fruit (15 days later) in order to measure the picking force, i.e. the force in pounds (lb.) required to cause the apples and citrus fruits to drop.

In the following table is given the average value of the applied picking force.

A basis of comparison was provided by the average value of the applied picking force obtained from measurements on seven untreated trees.

| Active substance number | Average value of picking-force in pounds | |
|---|---|---|
| | Apples | Temple oranges |
| 10..... (N-2,6-dimethylphenylthiourea)............ | 4.3 | 2.4 |
| 17..... [N-(4-fluorophenyl)-N'-(2'-chloroallyl)-thiourea]. | 3.7 | 4.2 |
| 19..... [N-(3-fluorophenyl)-N'-[2'-chloroallyl)-thiourea]. | 4.4 | .......... |
| Control (untreated)......................... | 7.0 | 12.1 |

What is claimed is:

1. A process for the promotion of fruit abscission which comprises applying to the fruit-bearing plants, shortly before the ripening of the fruit, an effective amount of a compound corresponding to the formula $$R_1-NH-\overset{S}{\underset{\|}{C}}-NH-R_3$$

wherein $R_1$ represents a phenyl radical mono- or disubstituted by lower alkyl or halogen; and $R_3$ represents hydrogen or chloroallyl.

2. The process according to claim 1 in which the compound is N-2,6-dimethylphenylthiourea.

3. The process according to claim 1 in which the compound is N-(4-fluorophenyl)-N'-(2'-chloroallyl)-thiourea.

4. The process according to claim 1 in which the compound is N-(3 - fluorophenyl)-N'-(2'-chloroallyl)-thiourea.

References Cited

UNITED STATES PATENTS

| 2,967,101 | 1/1961 | Hamm et al. | 71—99 |
| 3,457,292 | 7/1969 | Johnson | 71—99 |
| 3,491,146 | 1/1970 | Cornell, Jr. et al. | 260—552 R |

FOREIGN PATENTS

| 750,052 | 11/1970 | Belgium | 260—552 |

OTHER REFERENCES

Jackson et al., "Intermed. and Dyestuffs, etc.," (1969), J. Org. Chem., pp. 268–72 (1969).

Kurzer et al., "Urea and Related Cmpds., etc.," (1957), CA 52, pp. 9089–91 (1958).

GLENNON H. HOLLRAH, Primary Examiner

U.S. Cl. X.R.

71—70, 74, 88, 94, 95; 260—293.56, 293.85, 326.81, 326.82, 346.2, 402.5, 552 R, 552 SC